M. McGLOCHLIN.
PNEUMATIC TIRE RIM.
APPLICATION FILED JAN. 26, 1921.

1,410,067.

Patented Mar. 21, 1922.

Montezuma McGlochlin
INVENTOR

BY J. M. Thomas

ATTORNEY

UNITED STATES PATENT OFFICE.

MONTEZUMA McGLOCHLIN, OF PRICE, UTAH.

PNEUMATIC-TIRE RIM.

1,410,067.  Specification of Letters Patent.   Patented Mar. 21, 1922.

Application filed January 26, 1921. Serial No. 440,187.

*To all whom it may concern:*

Be it known that I, MONTEZUMA McGLOCHLIN, a citizen of the United States, residing at Price, in the county of Carbon and State of Utah, have invented certain new and useful Improvements in Pneumatic-Tire Rims, of which the following is a specification.

My invention relates to rims for pneumatic tires, and has for its object to provide a rim for vehicles on which are used pneumatic tires, which rim may be quickly and easily removed from the pneumatic tire without the use of tire tools.

These objects I accomplish with the rim illustrated in the accompanying drawings, in which similar letters and numerals of reference indicate like parts throughout the several views, and as described in the specification forming a part of this application and pointed out in the appended claims.

Figure 1:
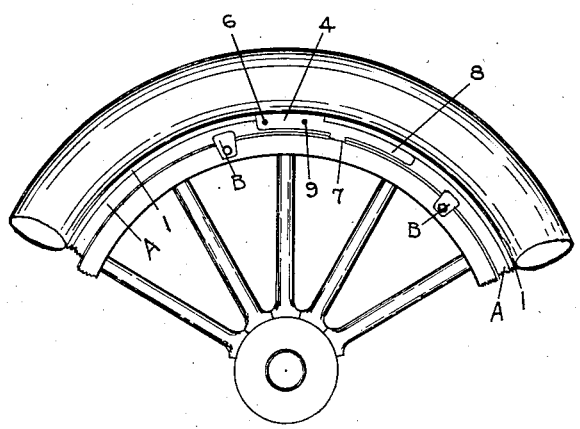
Figure 2:
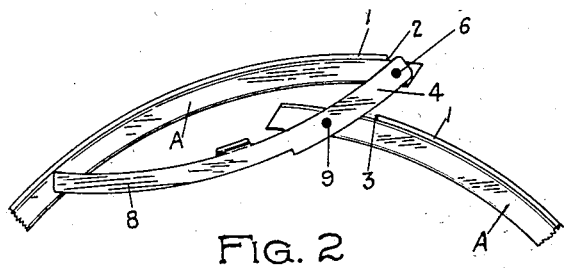
Figure 3:
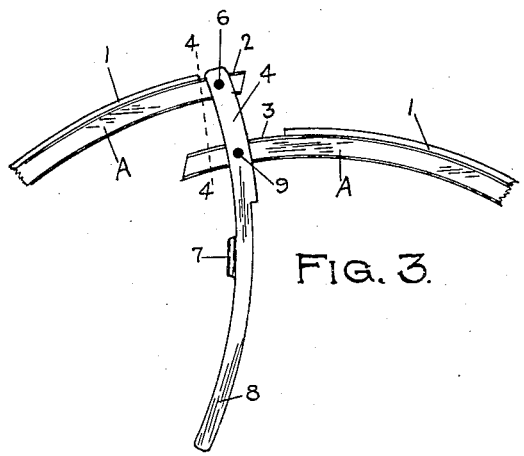
Figure 4:
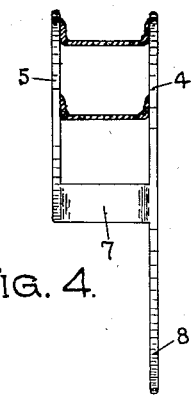

In the drawings in which I have shown a substantial embodiment of my invention, Figure 1 is a side elevation of a portion of an automobile wheel showing my invention in place thereon. Figure 2 is a portion of the rim with the tire and wheel removed, and showing the device fully operated to collapse the rim. Figure 3 is a portion of the rim with the device only partially operated. Figure 4 is a plan view of the link connection and lever arm, with the rim shown in section on line 4—4 of Figure 3.

In removing from and replacing deflated pneumatic tires on vehicle wheel rims of the demountable rim type some use the common tools about the vehicle, others provide tire tools of special and intricate construction and operation to remove the tire. I provide an improved rim having special members attached thereon which are easily operated, simple and efficient, and by which the rim is lessened in circumference and the tire changed ready for inflation in less time than now practiced. In the present invention the common channel metal rim form A is used having outwardly extended flanges 1 thereon, and where the joint is made the ends of the channel material are cut at an angle to form a close fitting joint. Portions of the said flanges adjacent to the joint are cut away as at 2 and 3 to allow the links 4 and 5 to take their places when the rim is in the extended form as shown in Figure 1. Each of said links has one end pivoted to a side of the channel rim A by the pivot pins 6 which are countersunk rivets. The other ends of the said links 4 and 5 are connected by the cross plate 7 and the said link 4 is extended to form the lever arm 8. The other angled end of said rim A is pivoted to the said links 4 and 5 by the rivets 9 and said rivets are so positioned that when the rim is in the extended position the links will hold the ends of the rim in close contact and the cross plate 7 will bear against the bottom of the channel. The said cross plate 7 is thin enough that it does not interfere with the fastening of the rim on the felloe of the wheel by means of the commonly used fasteners B, and the said links 4 and 5 with the extended arm 8 fit closely against the rim, as shown in Figure 1.

The operation of my device is as follows:—
Desiring to remove a tire the operator moves the lever arm 8 toward the axis of the rim A, which movement draws the ends of the rim to the position shown in Figure 3 and completing the said movement collapses the rim and throws the device to the position shown in Figure 2. The circumference of the rim is thus reduced and the tire may be easily removed and the other tire placed around the rim. The movement of the lever arm 8 in the reverse direction will extend the rim and fasten it within the tire by the spring tension of the rim, which rim is uncut except at the joint.

I thus provide a new and novel vehicle rim with link connections at the joint a portion of one of which links is extended as a lever arm for operating the device.

Having described my invention and its operation I desire to secure by Letters Patent and claim:—

1. In a vehicle wheel rim the combination of a channel rim having inclined abutting ends; integral outwardly extended flanges with portions of each flange omitted at each end of said rim; co-acting links permanently pivoted between the ends of said rim and curved to conform with and of length sufficient to complete the circle of said flanges; a cross plate connecting the two links; and a lever arm integral with one of said links and curved to conform with one of said flanges.

2. A wheel rim for pneumatic tires comprising a channel rim having abutting ends and a cutaway portion at the side and near the ends of the rim, links permanently pivoted on the sides between the ends of the rim in said cutaway portions and curved concentric with said rim, a cross plate connecting the said links and adapted to bear against the inner face of said rim, and a lever arm rigidly connected to one of said links to move said links and thereby the end portions of said rim.

3. A one piece wheel rim for pneumatic tires having outwardly extending flanges, said rim being severed at one place and having its flanges cut away at the ends of the severed rim, a link permanently pivoted at said cutaway portion and having a handle curved to conform to the rim circumference and normally resting snugly against the inner curved portion of said flange whereby no portion of the link projects beyond the outer surface of the rim flange.

In testimony whereof I have affixed my signature.

MONTEZUMA McGLOCHLIN.